United States Patent Office 3,202,590

Patented Aug. 24, 1965

3,202,590
ELECTRODEPOSITION OF COBALT-PHOSPHORUS ALLOYS

Herman Koretzky, Yorktown Heights, N.Y., assignor to International Business Machines Corporation, New York, N.Y., a corporation of New York No Drawing. Filed Aug. 19, 1960, Ser. No. 50,568
2 Claims. (Cl. 204—43)

This invention relates to electrodeposition of cobalt-phosphorus alloys from an acid solution and more particularly to the electrodeposition of cobalt-phosphorus alloys having coercive forces of about 350 oersteds.

In conventional hard magnetic coatings, used as memory storage media in the present day computer industry, the sought-after coercive force of the coating is a compromise between desired high bit density which is achieved with materials having high coercive forces and the availability and the ability of conventional recording equipment to record on surfaces having exceedingly high coercive forces. In practice, the art recognizes today that a coating having a coercive force greater than 200 oersteds and less than 400 oersteds, preferably about 350 oersteds, would fulfill a particular need of the industry for certain applications involving magnetic storage.

Accordingly, an object of the present invention is to produce hard magnetic coatings of cobalt phosphorus alloys having coercive forces greater than 200 oersteds and less than 400 oersteds.

The foregoing and other objects, features and advantages of the invention will be apparent from the following more particular description of preferred embodiments of the invention.

In accordane with the present invention, cobalt-phosphorus alloys are electrodeposited from an electrolyte consisting of a solution of cobalt chloride, $CoCl_2 \cdot 6H_2O$, in the range 50–400 g./l. and sodium hypophosphite, $NaH_2PO_2 \cdot H_2O$, 16–32 g./l. at a pH of about 4.0–4.8. The plating is carried out at room temperature and at a current density of 200–2200 amps per sq. ft. to give magnetic coatings having a coercive force in the range of 260–360 oersteds and a remanence value, $B_r$, of 7.0 kilogauss, at 1000 oersted drive fields.

The following examples illustrate the preferred range of compositions and plating conditions according to the present invention.

*Examples*

| | I | II | III | IV | V | VI |
|---|---|---|---|---|---|---|
| $CoCl_2 \cdot 6H_2O$, (g./l.) | 200 | 200 | 50 | 200 | 100 | 400 |
| $NaH_2PO_2 \cdot H_2O$, (g./l.) | 15.5 | 16.0 | 32.0 | 32.0 | 32.0 | 5.5 |
| pH | 4.0 | 4.8 | 4.8 | 4.8 | 4.8 | 4.8 |
| Current Density (amps./sq. ft.) | 550 | 550 | 2,200 | 550 | 220 | 330 |
| Plating time (min.) | 10 | 10 | 5 | 10 | 20 | 20 |
| Coercive Force, $H_c$ (oersteds) | 320 | 300 | 260 | 350 | 300 | 360 |
| Temperature | Room Temperature | | | | | |

All the deposits formed according to the process described above were sound, hard coatings which could be plated on discs or drums and used directly as magnetic storage media in present day computer equipment.

While the cobalt and hypophosphite ions have been expressed as the chloride and sodium salt respectively, it will be apparent to those skilled in the art that other anions and cations which supply the requisite ions may be used as well.

It is apparent that in Example I above the cobalt ion concentration will be about 50 grams per liter and the hypophosphite ion concentration will be about 9.5 grams per liter. In Example V, the cobalt ion concentration will be about 25 grams per liter and the hypophosphite ion concentration will be about 19.6 grams per liter.

While the invention has been particularly shown and described with reference to preferred embodiments thereof, it will be understood by those skilled in the art that various changes in form and details may be made therein without departing from the spirit and scope of the invention.

What is claimed is:

1. A method of electroplating magnetic coatings of cobalt-phosphorus alloys on a substrate which comprises subjecting said substrate to electrolytic action in a plating bath having a pH of about 4.0, consisting essentially of about 50 grams per liter of cobalt ions and about 9.5 grams per liter of hypophosphite ions at a current density of 550 amperes per square foot to produce thereby a magnetic coating having a coercive force of about 320 oersteds when such deposition takes place for about 10 minutes at room temperature.

2. A method of electroplating magnetic coatings of cobalt-phosphorus alloys on a substrate which comprises subjecting said substrate to electrolytic action in a plating bath having a pH of about 4.8, consisting essentially of about 25 grams per liter of cobalt ions and about 19.6 grams per liter of hypophosphite ions at a current density of 220 amperes per square foot to produce thereby a magnetic coating having a coercive force of about 300 oersteds when such deposition takes place for about 20 minutes at room temperature.

References Cited by the Examiner

UNITED STATES PATENTS 2,619,454 11/52 Zapponi ---------------- 204—43
2,643,221 6/53 Brenner et al. ---------- 204—43
2,644,787 7/53 Bonn et al. ------------ 204—43
2,739,107 3/56 Ricks ------------------ 204—43

JOHN H. MACK, *Primary Examiner.*

JOHN R. SPECK, *Examiner.*